H. ZWICKER, Sr.
FRUIT CATCHER.
APPLICATION FILED JUNE 21, 1918.

1,290,008.

Patented Dec. 31, 1918.
2 SHEETS—SHEET 1.

Witnesses
F. Ackman Jr.

Inventor
Herman Zwicker Sr.
By Victor J. Evans
Attorney

H. ZWICKER, Sr.
FRUIT CATCHER.
APPLICATION FILED JUNE 21, 1918.
1,290,008.
Patented Dec. 31, 1918.
2 SHEETS—SHEET 2.
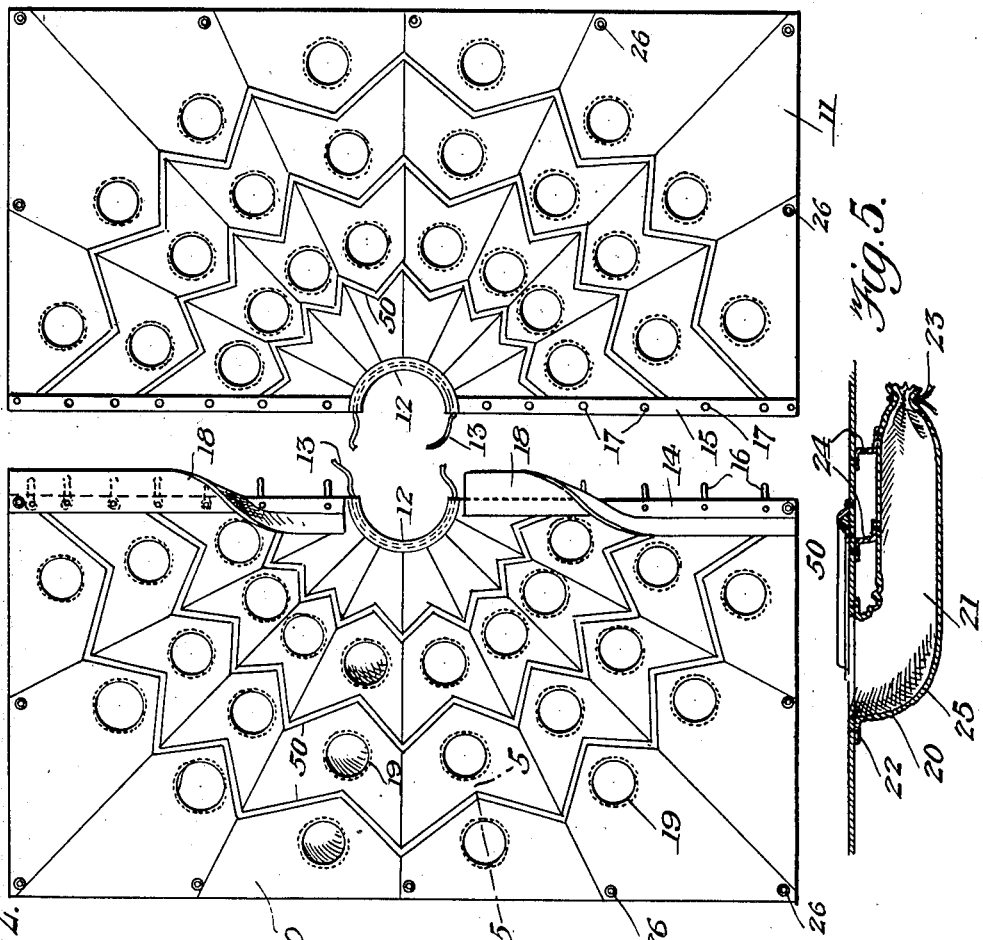
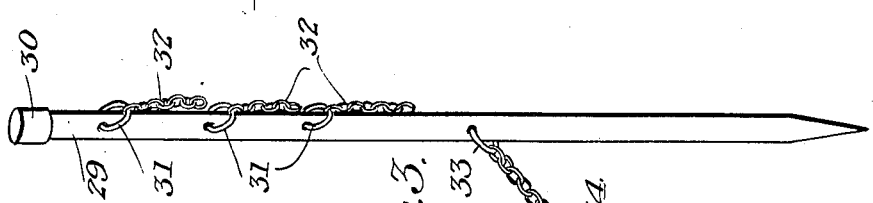
Witnesses
Inventor
Herman Zwicker Sr.
By Victor J. Evans
Attorney

UNITED STATES PATENT OFFICE.

HERMAN ZWICKER, SR., OF WHEELING, WEST VIRGINIA.

FRUIT-CATCHER.

1,290,008.     Specification of Letters Patent.      Patented Dec. 31, 1918.

Application filed June 21, 1918. Serial No. 241,234.

*To all whom it may concern:*

Be it known that I, HERMAN ZWICKER, Sr., a citizen of the United States, residing at Wheeling, in the county of Ohio and State of West Virginia, have invented new and useful Improvements in Fruit-Catchers, of which the following is a specification.

Much of valuable crops from fruit and nut trees is lost, incident to the dropping of the fruit or nuts from the trees before the harvesting thereof. Fruit dropping from a tree becomes injured by contact with the ground, and soon rots, but even were the fruit gathered before the same becomes infected by rot, the market value thereof is much depreciated because of its bruised condition. Nuts dropping from a tree to the ground soon become infected by worms and are also lost in the undergrowth beneath the tree.

It is the object of the present invention to produce a fruit gatherer or harvester that may be readily, easily and quickly arranged around and secured to the trunk of a tree, and which will catch the fruit or nuts should the same drop from the tree, by force of the elements or when the tree is shaken by hand to insure the harvesting of all of the fruit from the tree.

It is also my purpose to produce a fruit gatherer in the nature of a canvas body constructed in sections which are easily connected and which are easily secured to the trunk of the tree, said body being supported on suitable stakes and being adjustable with respect to the stakes whereby the body may be properly positioned on the tree, and properly bellied or concaved, the said body having a plurality of openings each communicating with an angular end of a horizontally disposed sack, the said sacks being arranged below the canvas body and having their outer ends closed or provided with valves which, when opened permits of the outlet of fruit therefrom, the arrangement of the sacks being such that the fruit therein cannot violently contact with each other to result in the bruising thereof.

It is a further object of the invention to produce a fruit gatherer which shall be of a simple and cheap construction, and thoroughly efficient for the purposes for which it is designed.

Other objects and advantages will appear as the nature of the invention is better understood, reference being had to the accompanying drawings, in which, Figure 1 is a perspective view illustrating the application of the improvement.

Fig. 2 is a plan view of the canvas body, the sections comprising the same being separated.

Fig. 3 is a perspective view of one of the stakes and the flexibly connected brace pin therefor.

Fig. 4 is a perspective view of one of the chains designed to engage with the fabric body to adjustably support the same upon the stake.

Fig. 5 is a greatly enlarged sectional view approximately on the line 5—5 of Fig. 2.

Figure 1:
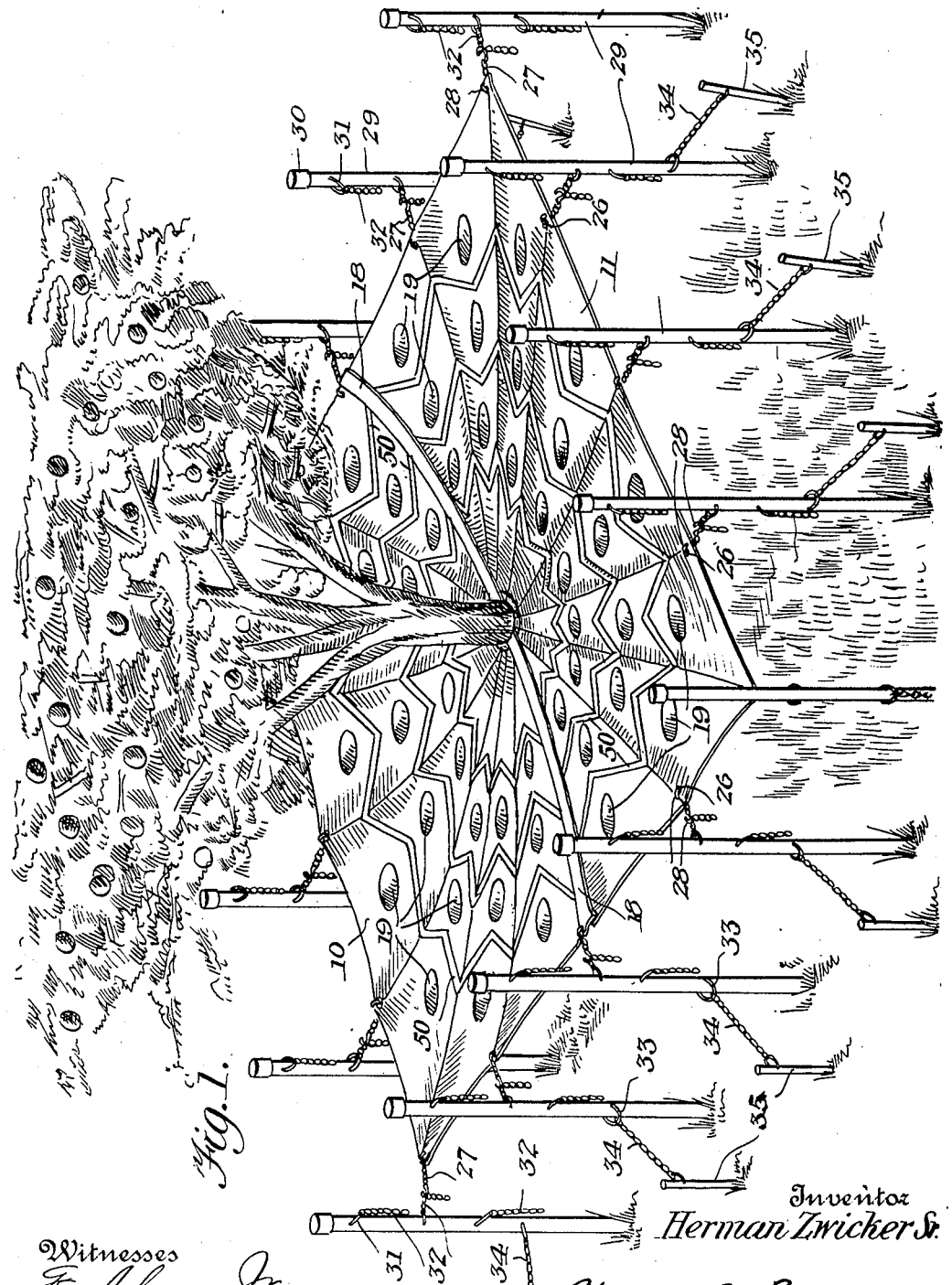

As disclosed by the drawings, I employ a substantially square or rectangular canvas body formed of a plurality of sections, two being preferable, as illustrated. For distinction one of the sections is indicated by the numeral 10 and the second section by the numeral 11. Both of the sections may be constructed of a plurality of connected strips having their angular edges stitched together, and each of the sections, upon their inner edges is centrally formed with an approximately semi-cylindrical cut-away or depressed portion. The edge provided by this semi-cylindrical depression is lapped and stitched and preferably provided with gathers. Through the gathers 12 of each of the sections is passed a draw string 13, and when the trunk of the tree is received between the depressed portions of the sections 10 and 11, the ends of the respective draw strings 13 are connected together, or, if desired, the respective draw strings may be brought around the tree and the ends thereof knotted after securing the sections 10 and 11 to the tree.

Each of the sections 10 and 11 has its inner edge preferably reinforced as indicated by the numerals 14 and 15 respectively. The reinforcing strip 14 has secured thereto hooks 16, and the reinforcing strip 15 is provided with eyes 17 that are engaged by the hooks 15, thus connecting the sections 10 and 11. The section 10, adjacent to the inner edge thereof is provided with a flap 18, and this flap is brought over the edge of the section 11, bridging the confronting edges of the respective sections.

Each of the sections is provided with series of radially disposed concentrically arranged round openings 19 surrounded by the angle ends 20 of sacks 21. The outer edge of the angle ends 20 of the respective sacks 21 are bent outwardly, or provided with outstanding flanges 22 which are stitched or otherwise securely connected to the sections 10 and 11. The outer end of each of the sacks 21 is preferably gathered, and passing through these gathers are draw strings 23, whereby the mouths of the sacks may be closed. The sacks 21 are sustained horizontally, or in a plane with the fabric body through the medium of brace or connecting elements 24 secured to the upper faces of the respective sacks and the under faces of the respective sections 10 and 11. It will be noted that the connecting wall between the sacks and the ends 20 thereof is round, and the fruit, falling from the tree contacting with this wall, which for distinction is indicated by the numeral 25, will be delivered thereby into the sacks proper, so that danger of one fruit violently contacting with another fruit already in the sack or pocket will be thus obviated.

As disclosed by the drawings, the sections 10 and 11, at the outer edges thereof are provided with spaced openings which are preferably surrounded by eyelets, and these openings are indicated by the numerals 26. Passed through each of these openings are flexible elements 27 which preferably have both of their ends provided with hooks 28.

Preferably, but not necessarily, before either of the sections 10 and 11 are secured to the trunk of the tree, but after the proper points for the driving thereof, corner stakes are inserted in the ground. As the corner as well as the intermediate stakes are of a similar construction, all of the stakes will be broadly indicated by the numeral 29. Each of the stakes has its upper end preferably provided with a metallic reinforcement 30 so that the wooden stake will not be injured when under the force of contact with a maul or other instrument for driving the pointed end thereof into the ground. Each of the stakes 29, at suitable intervals, adjacent the upper ends thereof are provided with spaced openings through which are passed rings 31, and to each of these rings is secured a flexible element such as a chain 32. The rings 31, and the chains 32 are disposed opposite the edges of the fabric body, and below the series of rings 31 the stake is provided with an additional opening through which is passed a ring 33 that is directed outwardly of the said stake, and to this ring 33 is secured, through the medium of a flexible element or chain 34, a pin 35. The pin 35 is also adapted to be driven into the ground at an angle with respect to the stake 29, and the flexible connection 34 between the pin and stake provides a brace between these members and serves to tilt or cant the stake 29 outwardly of the fabric body so that the said body may be drawn taut.

The hooks 28 on the chains 27 are adapted to be engaged in the links of any of the series of chains 32 so that the fabric body may be adjusted with respect to the trunk of the tree, and also whereby the said body may be dished to permit of the fruit falling from the tree being delivered through the openings 19 into the respective sacks 21.

The sections 10 and 11 have secured upon the upper faces thereof canvas strips 50. These strips are arranged in series to the rear, or inward of the respective series of openings 19. The strips are stitched so as to provide triangular portions, the opposite angles of which being arranged to the opposite sides of each of the openings 19. These strips form stops for the fruit as well as directing means therefor, so that the fruit will be properly received in the sacks 21 and will be prevented from rolling over the device to the central portion thereof which portion is not provided with the openings nor the sacks.

The device is of a construction and is designed to be of a size whereby fruit or nuts falling from a tree, either accidentally or when shaken from the tree, the same will be received on the body and deposited in the sacks thereof, so that such fruit will not be injured by forcible contact with the ground, or permitted to rot on the ground. The fruit may be readily removed from the sacks by opening the mouths thereof, and it is believed that the simplicity and advantages of the construction will be apparent without further description.

Having thus described the invention, what I claim is:

1. A fruit harvester, comprising a sheet of flexible material having a central opening therein and a series of concentric spaced openings, sacks supported on the under face of the sheet having angle ends surrounding said last-mentioned openings and secured to the sheet, and supports for said sheet.

2. A fruit harvester, comprising a sheet of flexible material having a central opening therein and a series of concentric spaced openings, sacks supported on the under face of the sheet, said sacks having inner angle ends surrounding the last-mentioned openings and secured to the sheet, means for closing the outer ends of the sacks, and supporting means for the sheet.

3. A fruit harvester, comprising a sheet of flexible material having a central opening therein and a series of concentric spaced openings, sacks having outer open ends and inner angular ends which are also open, means for closing the outer ends of the sacks, means for connecting the sacks to the sheet and for sustaining the same parallel with the sheet, means for securing the angle ends of the sacks to the sheet whereby the latter surround the last mentioned concentric openings in the sheet, and supports for the sheet.

4. A fruit harvester, comprising a sheet of flexible material having a central opening therein and a series of concentric openings, sacks comprising angle members arranged beneath the sheet, means between longitudinal portions of the said sacks and the sheet for securing the sacks to the sheet and for sustaining the same parallel with the sheet, each of said sacks having its outer end gathered, a draw string passing through said gathers whereby to close the said outer ends of the sacks, the angle ends of the sacks being secured to the under face of the sheet to surround the concentrically arranged openings therein, and supports for the sheet.

5. A fruit harvester comprising a sheet of flexible material formed in two sections, each of said sections having its inner edge reinforced, each of said sections, at its said inner edge having a central opening which is gathered, draw strings passing through the gathers, connecting means between said inner edges of the sections, said sheet having concentric openings, longitudinally disposed sacks having offset ends which are secured around the openings, and supports for the sheet.

6. A fruit harvester comprising a sheet of flexible material having a central opening therein and outer series of openings, angle stop members disposed inward of the last mentioned openings, and supports for the sheet.

In testimony whereof I affix my signature.

HERMAN ZWICKER, Sr.